US012789607B2

(12) United States Patent
Hahn et al.

(10) Patent No.: US 12,789,607 B2
(45) Date of Patent: Nov. 10, 2026

(54) ELECTRIC DRIVE DEVICE FOR A MOTOR VEHICLE, IN PARTICULAR FOR A MOTOR CAR

(71) Applicant: MERCEDES-BENZ GROUP AG, Stuttgart (DE)

(72) Inventors: Peter Hahn, Stuttgart (DE); Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 15 days.

(21) Appl. No.: 19/121,466

(22) PCT Filed: Oct. 12, 2023

(86) PCT No.: PCT/EP2023/078425
§ 371 (c)(1),
(2) Date: Apr. 16, 2025

(87) PCT Pub. No.: WO2024/083657
PCT Pub. Date: Apr. 25, 2024

(65) Prior Publication Data

US 2026/0139728 A1 May 21, 2026

(30) Foreign Application Priority Data

Oct. 17, 2022 (DE) ..................... 10 2022 003 833.1

(51) Int. Cl.
*B60K 1/00* (2006.01)
*F16D 11/10* (2006.01)
(Continued)

(52) U.S. Cl.
CPC ................ *B60K 1/00* (2013.01); *F16D 11/10* (2013.01); *F16H 3/66* (2013.01); *F16H 63/04* (2013.01);
(Continued)

(58) Field of Classification Search
CPC ...... B60K 2001/001; B60K 2006/4841; B60K 17/08; F16D 11/14; F16D 2011/004;
(Continued)

(56) References Cited

U.S. PATENT DOCUMENTS

| | | | | |
|---|---|---|---|---|
| 10,955,032 | B2 * | 3/2021 | Scheerer | F16H 63/04 |
| 2019/0111781 | A1 | 4/2019 | Keeney et al. | |

(Continued)

FOREIGN PATENT DOCUMENTS

| | | | |
|---|---|---|---|
| CN | 114312144 | A | 4/2022 |
| DE | 4121709 | A1 | 1/1992 |
| DE | 102019128160 | B3 | 11/2020 |

OTHER PUBLICATIONS

International Search Report and Written Opinion mailed Dec. 12, 2023 in related/corresponding International Application No. PCT/EP2023/078425.

(Continued)

*Primary Examiner* — Derek D Knight
(74) *Attorney, Agent, or Firm* — PATENT PORTFOLIO BUILDERS PLLC

(57) ABSTRACT

An electric drive device for a motor vehicle includes a first gear element having an internal toothing, a second gear element arranged coaxially to the first gear element and having a first external toothing arranged radially inside the internal toothing, and a third gear element arranged coaxially to the first gear element and coaxially to the second gear element and having a second external toothing arranged radially inside the internal toothing. The device also includes a sliding sleeve having an internal sliding sleeve toothing and an external sliding sleeve toothing. The sliding sleeve is permanently connected to the first gear element for conjoint rotation via the external sliding sleeve toothing and the internal toothing.

8 Claims, 3 Drawing Sheets

Figure 1:
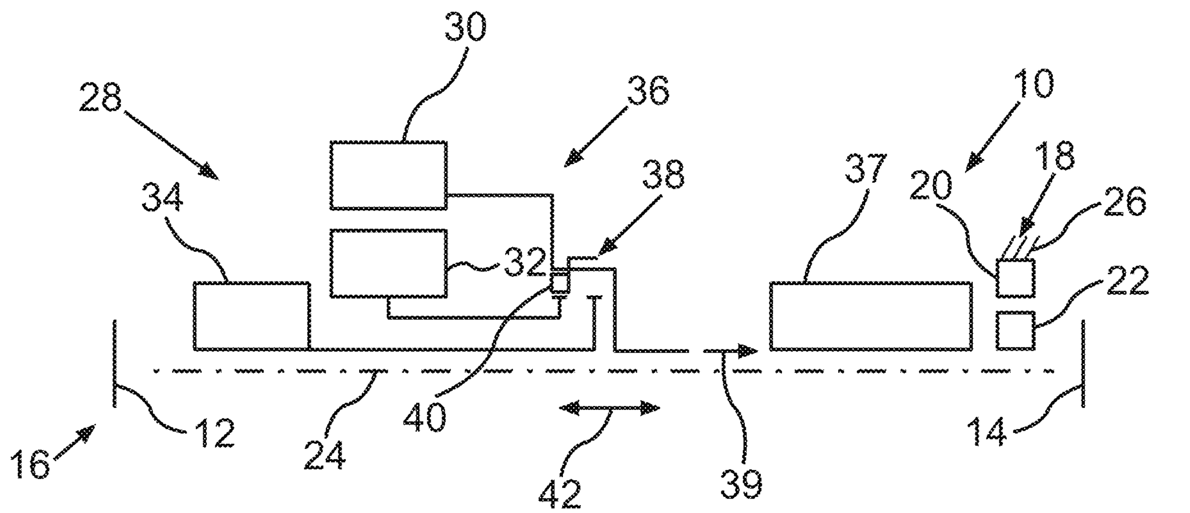

(51) Int. Cl.
*F16H 3/66* (2006.01)
*F16H 63/04* (2006.01)
*F16D 25/00* (2006.01)
*F16D 28/00* (2006.01)
*F16H 63/32* (2006.01)

(52) U.S. Cl.
CPC .............. *F16D 25/00* (2013.01); *F16D 28/00* (2013.01); *F16H 63/32* (2013.01); *F16H 2200/0021* (2013.01); *F16H 2200/0034* (2013.01); *F16H 2200/2005* (2013.01); *F16H 2200/2094* (2013.01)

(58) Field of Classification Search
CPC .......... F16D 11/10; F16H 63/04; F16H 63/32; F16H 2200/2094; F16H 2200/2005
See application file for complete search history.

(56) References Cited

U.S. PATENT DOCUMENTS

| | | | |
|---|---|---|---|
| 2020/0247236 | A1 | 8/2020 | Hirao et al. |
| 2022/0118847 | A1 | 4/2022 | Ekonen et al. |

OTHER PUBLICATIONS

Office Action created Jul. 4, 2023 in related/corresponding DE Application No. 10 2022 003 833.1.

* cited by examiner

ELECTRIC DRIVE DEVICE FOR A MOTOR VEHICLE, IN PARTICULAR FOR A MOTOR CAR

BACKGROUND AND SUMMARY OF THE INVENTION

Exemplary embodiments of the invention relate to an electric drive device for a motor vehicle, in particular for a motor car.

From the general prior art, electric drive devices for motor vehicles and motor vehicles having such electric drive devices are sufficiently well known. The respective motor vehicle having the respective electric drive device can be electrically driven, in particular purely electrically, by means of the electric drive device. In this case, a particularly space-efficient construction of the respective electric drive device is desirable.

Exemplary embodiments of the present invention are directed to an electric drive device for a motor vehicle such that a particularly compact and thus space-efficient construction and simultaneously a particularly advantageous operation of the electric drive device can be realized.

The invention relates to an electric drive device for a motor vehicle, also simply referred to as a vehicle, preferably formed as an automobile, in particular as a passenger car. This means that, in its completely produced state, the motor vehicle has the electric drive device and can be driven electrically, in particular purely electrically by means of the electric drive device. Thus, the motor vehicle is preferably designed as a hybrid vehicle or as an electric vehicle, in particular as a battery electric vehicle (BEV). For example, the electric drive device has at least one electric engine, by means of which the motor vehicle can be electrically driven, in particular purely electrically. Preferably, the electric engine is a high-voltage component, the electric voltage of which, in particular electric operating or rated voltage, is preferably greater than 50 volts, in particular greater than 60 volts, and more preferably is several hundred volts.

The electric drive device has a first gear element, a second gear element, and a third gear element. In particular, the electric drive device has a gearbox comprising the gear elements. For example, the electric drive device has a housing in which the gear elements can be arranged. For example, the motor vehicle can be driven via the gearbox or the gear elements. For example, in its completely produced state, the motor vehicle has at least or exactly two vehicle axles, also simply referred to as axles, arranged successively and thus one behind the other in the vehicle longitudinal direction. The respective vehicle axle has at least or exactly two vehicle wheels, also simply referred to as wheels. For example, the respective vehicle wheels of the respective vehicle axle are arranged on opposite sides of the motor vehicle in the vehicle transverse direction of the motor vehicle. The vehicle wheels are ground contact elements, by which the motor vehicle is or can be supported downwards on ground, in the vehicle vertical direction of the motor vehicle. If the motor vehicle drives along the ground while the motor vehicle is supported downwards on the ground by the ground contact elements in the vehicle vertical direction, the vehicle wheels roll, in particular directly, on the ground. Therefore, for example, the electric drive device can electrically drive, in particular purely electrically, the vehicle wheels of at least or exactly one of the vehicle axles or the vehicle wheels of both vehicle axles. The vehicle wheels driven by means of the drive device are also referred to as drive wheels. When the vehicle wheels are referred to in the following, unless otherwise stated, this means the drive wheels. For example, the drive wheels can be driven via the gear elements by the electric drive device, in particular by the electric engine.

For example, the electric engine has a stator and a rotor, which can be driven by means of the stator, for example, and therefore can be rotated around an engine rotational axis relative to the stator. In particular, the electric engine can provide drive torques via its rotor for driving the motor vehicle, in particular drive wheels. For example, the respective drive torque that is or can be provided to an electric engine via its rotor can be transmitted to the vehicle wheels via the gearbox or via the gear elements. Thus, the gearbox, for example, can provide the respective drive torque or a respective output drive torque resulting from the respective drive torque for driving the vehicle wheels.

The gear elements are arranged coaxially to each other. This means that the second gear element is arranged coaxially to the first gear element, and the third gear element is arranged coaxially to the first gear element and coaxially to the second gear element. Thus, the respective gear element can be rotated relative to the housing around a gear element rotational axis, also simply referred to as a rotational axis, common to the gear elements. Particularly if the gear elements are not connected to each other for conjoint rotation, the gear elements can be rotated, for example, around the gear element rotational axis relative to each other.

The first gear element has an internal toothing. The second gear element has a first external toothing arranged radially inside the internal toothing, i.e., as viewed in the radial direction of the electric drive device. In particular, this is understood to mean that the first external toothing is arranged further inward than the internal toothing in the radial direction of the electric drive device, the axial direction of which runs perpendicular to the radial direction. In particular, the axial direction of the electric drive device coincides with the above-mentioned direction (rotational axis) according to the first embodiment. The third gear element has a second external toothing arranged radially inside the internal toothing, i.e., as viewed in the radial direction of the drive device. Thus, the second external toothing is also arranged further inward than the internal toothing, as viewed in the radial direction of the electric drive device.

The electric drive device has a sliding sleeve, which is also simply referred to as a sleeve or switching sleeve. In particular, the sliding sleeve is a component of a switching device, by means of which the electric drive device, in particular the gearbox, can be advantageously switched, as is explained in more detail in the following.

The sliding sleeve has an internal sliding sleeve toothing and an external sliding sleeve toothing. The sliding sleeve is permanently connected to the first gear element for conjoint rotation via the external sliding sleeve toothing and the internal toothing. This means that the external sliding sleeve toothing engages, in particular permanently, into the internal toothing, whereby the first gear element and the sliding sleeve are permanently connected to each other for conjoint rotation. Thus, the sliding sleeve is arranged coaxially to the gear elements, and the sliding sleeve can be co-rotated around the rotational axis in the first gear element.

In the context of the present disclosure, the feature that two components, such as the sliding sleeve and the first gear element, are connected to each other for conjoint rotation is understood to mean that the components connected to each other for conjoint rotation are arranged coaxially to each other and in particular when the components are driven, rotate together or simultaneously around a component axis of rotation common to the components, such, as for example, the aforementioned rotational axis, at the same speed, in particular relative to the housing. The feature that two components are permanently connected to each other for conjoint rotation is understood to mean that rather than a switching element being provided that can be switched between a coupled state, which connects the components to each other for conjoint rotation, and a decoupled state, in which the components are decoupled from each other and can be rotated relative to each other so that torques cannot be transmitted between the components via the switching element, instead the components are constantly or always connected to each other, i.e., permanently, for conjoint rotation. The feature that the external sliding sleeve toothing engages permanently into the internal toothing is understood to mean that rather than the drive device being able to be switched between an engaged state, in which the external sliding sleeve toothing engages into the internal toothing or vice versa, and a disengaged state, in which the external sliding sleeve toothing does not engage into the internal toothing, instead the external sliding sleeve toothing always or constantly engages into the internal toothing.

The sliding sleeve can be moved, in particular along a sliding direction and/or relative to the housing, between at least one first engage position, at least one second engage position, and at least one neutral position. For example, the sliding direction runs parallel to the axial direction or in the axial direction, or the sliding direction coincides with the axial direction of the drive device. The respective engage position is also referred to as an engaged position, and the neutral position is also referred to as the disengaged position, for example. The first engage position is a first position or is also referred to as a first position, the second engage position is a second position or is also referred to as a second position, and the neutral position is a third position or is also referred to as a third position.

In the first engage position, the sliding sleeve is connected to the second gear element for conjoint rotation via the internal sliding sleeve toothing and the first external toothing. Furthermore, in the first engage position the sliding sleeve is connected to the first gear element for conjoint rotation via the external sliding sleeve toothing and internal toothing, such that in the first engage position the first gear element and the second gear element are connected to each other for conjoint rotation by means of the sliding sleeve, such that the sliding sleeve, the first gear element, and the second gear element form a first rotation unit, which can be rotated as a block around the rotational axis relative to the housing, so to speak. Furthermore, the first rotation unit can be rotated around the rotational axis relative to the third gear element. Thus, in particular it is provided that in the first engage position the internal sliding sleeve toothing does not engage into the second external toothing, such that in the first engage position the internal sliding sleeve toothing and thus the sliding sleeve is decoupled from the third gear element, so that the third gear element is decoupled from the first rotation unit and thus can be rotated around the rotational axis relative to the first rotation unit. Again, expressed in other words, it is provided in the first engage position that the internal sliding sleeve toothing exclusively engages into the first external toothing in relation to the first external toothing and the second external toothing.

In the second engage position, the sliding sleeve is connected to the third gear element for conjoint rotation via the internal sliding sleeve toothing and the second external toothing, and in the second engage position, the sliding sleeve is connected to the first gear element for conjoint rotation via the external sliding sleeve toothing and the internal toothing. Thus, in the second engage position, the first gear element and the third gear element and the sliding sleeve are connected to each other for conjoint rotation. In other words, in the second engage position, the first gear element and the third gear element are connected to each other for conjoint rotation by means of the sliding sleeve, so that, for example, in the second engage position, the sliding sleeve, the first gear element and the third gear element form a second rotation unit, which can be rotated as a block, so to say, around the rotational axis relative to the housing and in particular also relative to the second gear element Thus, in the second engage position, the second gear element can be rotated relative to the second rotation unit, i.e., relative to the sliding sleeve, relative to the first gear element and relative to the third gear element.

Thus, in the second engage position, it is provided that the second gear element is decoupled from the sliding sleeve and also from the first gear element and from the third gear element, so that the second gear element can be rotated around the rotational axis relative to the second rotation unit. In the second engage position, the internal sliding sleeve toothing engages into the second external toothing, however not into the first external toothing. In other words, for example, in the second engage position, it is provided that the internal sliding sleeve toothing engages, in relation to the first external toothing and the second external toothing, exclusively into the second external toothing, so that the second gear element is decoupled from the rotation unit and can be rotated around the rotational axis relative to the second rotation unit.

In the neutral position, the sliding sleeve is connected, in relation to the gear elements, only or exclusively to the first gear element for conjoint rotation in that the sliding sleeve is connected to the first gear element for conjoint rotation via the external sliding sleeve toothing and the internal toothing. This means that in the neutral position, the internal sliding sleeve toothing engages neither into the first external toothing nor into the second external toothing, so that in the neutral position both the second gear element as well as the third gear element are decoupled from the sliding sleeve and thus from the first gear element. Thus, in the neutral position, the gear elements can be rotated around the rotational axis relative to each other. Again, expressed in other words, in the neutral position, the internal sliding sleeve toothing engages neither into the first external toothing nor into the second external toothing.

As the external sliding sleeve toothing engages into the internal toothing, the sliding sleeve is permanently connected to the first gear element for conjoint rotation in a form-fitting manner. As, in the respective engage position, the internal sliding sleeve toothing engages into the respective external toothing, in the respective engage position, the sliding sleeve is connected to the second gear element or to the third gear element for conjoint rotation in a form-fitting manner, so that the sliding sleeve is designed as a form-fitting switching element, in particular as a claw switching element. In the invention, therefore a particularly compact design of the switching device comprising the sliding sleeve and thus the external sliding sleeve toothing and the internal sliding sleeve toothing and preferably the internal toothing and the external toothing, in particular of the sliding sleeve itself, can be realized, so that a particularly compact design of the electric drive device overall can be realized. In particular, the sliding sleeve can be arranged particularly space-efficiently as a switching element, so that new advantageous gear configurations can be realized in comparison to conventional solutions.

In order to be able to realize a particularly compact design, in one embodiment of the invention, it is provided that an axial travel range, also referred to as an adjustment or movement range, within which the sliding sleeve can be moved between the positions, and/or an axial length of the internal toothing of the first gear element extends axially, i.e., viewed in the axial direction of the electric drive device and thus along the rotational axis, from the first external toothing of the second gear element up to the second external toothing of the third gear element.

A further embodiment is characterized in that the sliding sleeve has at least one radially, i.e., in the radial direction of the drive device, outwardly running bar penetrating a slot of the first gear element. Preferably, the slot is designed to be elongate in the axial direction of the drive device and/or along the sliding direction and thus as an elongated hole, so that with movement of the bar in the slot, in particular occurring along the sliding direction, the sliding sleeve can be moved axially, i.e., in the axial direction of the drive device, in the slot via the bar relative to the first gear element and for example also relative to the second gear element and relative to the third gear element between the positions. Therefore, the sliding sleeve can be moved particularly space-efficiently.

It can be seen that the first gear element can be selectively coupled to the second gear element or to the third gear element by means of the sliding sleeve. This means that a particularly advantageous and needs-based switching of the drive device can be realized. In particular, for example, a particularly advantageous switching of gears of the drive device, in particular of the gearbox, can be realized in a particularly space-efficient manner. Thus, a particularly advantageous drivability and thus a particularly advantageous operation of the drive device can be realized.

For example, at least or exactly two driving modes can be switched. For example, in the first engage position, a first driving mode is engaged, i.e., switched or activated, while the second driving mode is disengaged, i.e., deactivated. In the second engage position, for example, the second driving mode is engaged, i.e., activated, while the first driving mode is disengaged, i.e., deactivated, i.e., not switched. The driving modes differ from each other in the kinematic connection of an e-engine to the gearbox, which is used, for example, to determine the mode of action of the drive device, in particular from the electric engine and specifically the rotor, to the vehicle wheels.

Because the bar penetrates the slot of the first gear element, the bar penetrates the first gear element so that the bar crosses or intersects the first gear element, so to speak. Therefore, the sliding sleeve can be moved particularly space-efficiently and thus switched.

A further embodiment is characterized in that the bar extends radially outward away from a cylinder section of the sliding sleeve, in the radial direction of the electric drive device. The cylinder section is designed to be cylindrical on the inner circumference and/or outer circumference, i.e., in the form of a straight circular cylinder, in particular of a straight hollow cylinder. The internal sliding sleeve toothing is provided on an inner side of the cylinder section pointing radially inward, i.e., in the radial direction of the drive device. Preferably, the cylinder section and the internal sliding sleeve toothing are designed as one-piece together, i.e., formed from a single piece and thus formed by a monoblock or designed as a monoblock. It is also conceivable that the internal sliding sleeve toothing and the cylinder section are designed separately from each other and are connected to each other. The external sliding sleeve toothing is provided on an outer side of the cylinder section pointing radially outward, i.e., in the radial direction of the drive device, and thus away from the inner side. In this case, it is conceivable that the external sliding sleeve toothing and the cylinder section are designed as one-piece together, i.e., are formed from a single piece. It is also conceivable that the external sliding sleeve toothing and the cylinder section are designed separately from each other and are connected to each other. Therefore, a particularly compact design of the drive device can be realized.

In order to be able to move the sliding sleeve particularly space-efficiently, in a further embodiment of the invention, an actuating element, which can be moved in particular relative to the housing axially, i.e., in the axial direction of the drive device and thus along the sliding device for example, is provided, which actuating element can be designed, for example, as a shift fork. In particular, the sliding sleeve is able to move relative to the housing.

By means of the actuating element, the sliding sleeve can be moved axially between the positions with axial movement of the actuating element. In other words, in order to move the sliding sleeve in the axial direction of the drive device, also referred to as a drive system, in particular relative to the housing, the actuating element is moved axially, i.e., in the axial direction of the drive device, in particular relative to the housing.

In this case, it has proven to be particularly advantageous when the sliding sleeve can be moved axially between the positions via the bar by means of the actuating element with axial movement of the actuating element.

Preferably, the bar and the cylinder section are formed together as one-piece, i.e., are formed from a single piece. This means that the cylinder section and the bar are preferably not assembled from parts that are designed separately from each other and connected to each other, but preferably the cylinder section and the bar are formed from a single piece and thus are formed by a monoblock or designed as a monoblock. It is also conceivable that the bar and the cylinder section are designed separately from each other and are connected to each other, in particular for conjoint rotation and/or in the axial direction of the drive device. Therefore, particularly simple mounting and thus a particularly compact design can be realized.

In order to move the sliding sleeve axially, i.e., in the axial direction of the drive device and in particular relative to the housing, the actuating element is moved axially, in particular relative to the housing. In the process, the actuating element interacts with the bar, in particular in such a way that the actuating element is coupled to the bar. This means that a force, by means of which the actuating element and via this the sliding sleeve can be or is moved, can be or is transmitted from the actuating element onto the bar and thus via the bar onto the sliding sleeve, in order to axially move the sliding sleeve via the bar by means of the actuating element, in particular in that the actuating element is axially moved. Therefore, a particularly compact design can be realized.

If the actuating element is designed as the mentioned shift fork, it is conceivable that the shift fork engages around the bar, in particular at or over an angular range, which is greater than 90 degrees, in particular viewed in the circumferential direction of the sliding sleeve running around the axial direction of the drive unit.

In order to be able to realize a particularly compact design of the sliding sleeve, it is provided in a further embodiment of the invention that the first gear element has a through-opening, which, in particular, is continuous in the radial direction of the drive device. The actuating element engages through the through-opening of the first gear element, so that the through-opening of the gear element is penetrated by the actuating element. The actuating element therefore engages into a corresponding cavity of the sliding sleeve, which can be moved axially between the positions relative to the first gear element by means of the actuating element with axial movement of the actuating element in the through-opening. In other words, in order to axially move the sliding sleeve particularly space-efficiently between the positions, the actuating element is axially moved, wherein the actuating element is moved in the through-opening of the first gear element. The through-opening of the first gear element is preferably designed to be elongate along the sliding direction or in the axial direction of the drive device and thus, for example, as an elongated hole, so that the actuating element can be moved axially in the through-opening of the first gear element and relative to the first gear element, while it penetrates the through-opening of the first gear element, in order to axially move the sliding sleeve as a result. Therefore, the installation space requirement of the switching device and thus of the drive device overall can be kept particularly low.

In order to be able to realize a particularly advantageous, space-efficient and needs-based movement of the sliding sleeve, in a further embodiment of the invention an electromechanical or hydraulic actuating device is provided, by means of which the actuating element and the sliding sleeve, via the actuating element, can be moved axially.

Lastly, to realize a particularly low installation space requirement, it has been proven particularly advantageous when the first gear element is designed as a rotor shaft of the rotor of the electric engine. Preferably, in this case, the second gear element is designed as a first planetary gear set element of a planetary gear set, in particular of the gearbox. Furthermore, it is preferably provided that the third gear element is designed as a second planetary gear set element of the planetary gear set. In other words, preferably the electric drive device, in particular the aforementioned gearbox, has the mentioned planetary gear set, which is also simply referred to as a planet set. The planetary gear set has a sun gear, a planetary carrier and a ring gear. Furthermore, the planetary gear set has at least one planetary gear, for example, which is held rotatably on the planetary carrier and in particular simultaneously meshes with the sun gear and with the ring gear. The sun gear, the planetary carrier, and the ring gear are also referred to as gear elements or planetary gear set elements of the planetary gear set, so that the second gear element is a first of the planetary gear set elements of the planetary gear set and the third gear element is a second of the planetary gear set elements of the planetary gear set. Therefore, particularly advantageous switchability and consequently particularly advantageous drivability and particularly advantageous operation of the drive device can be realized in a particularly space-efficient manner.

Further advantages, features and details of the invention can be seen from the following description of a preferred exemplary embodiment and with reference to the drawing. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

BRIEF DESCRIPTION OF THE DRAWING FIGURES

Figure 2:
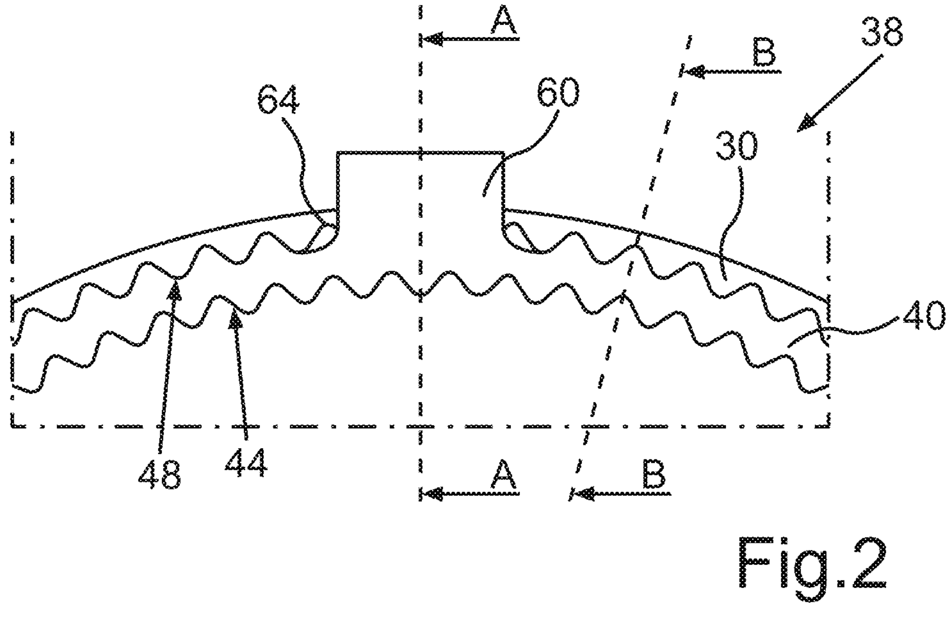
Figure 3:
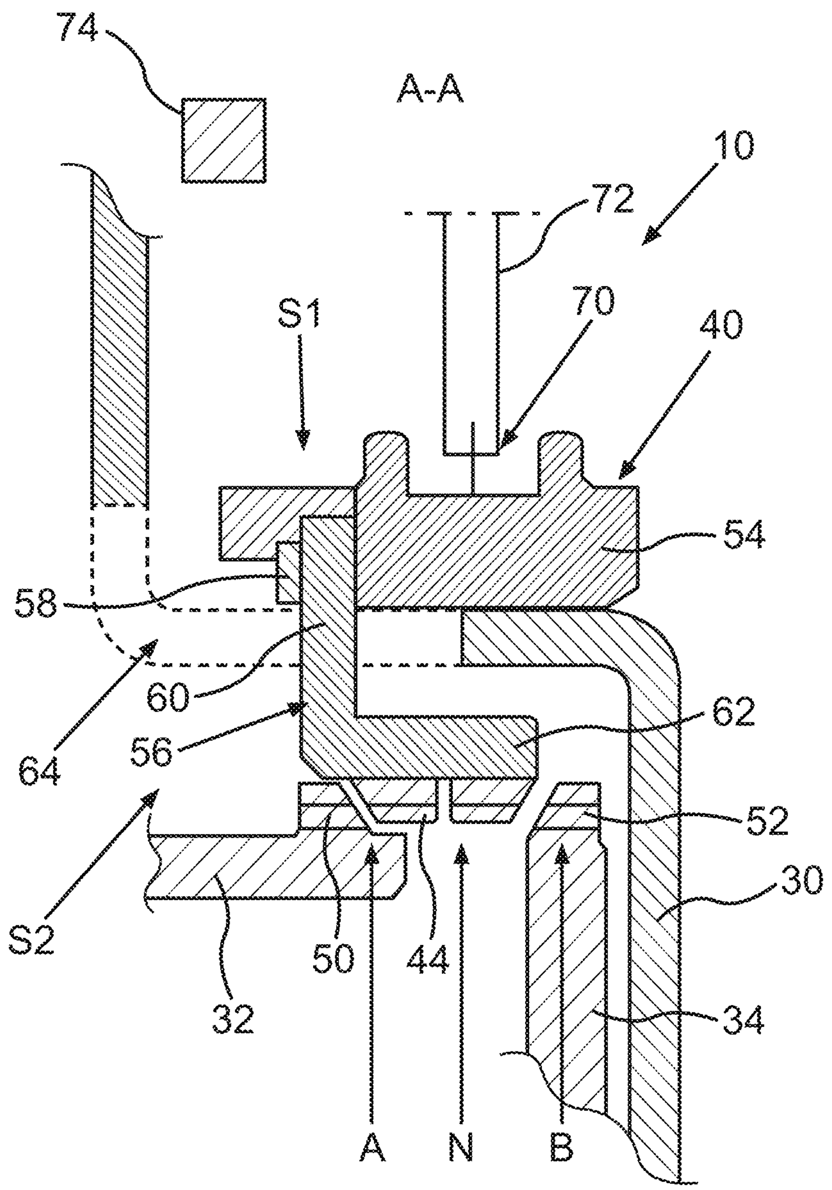
Figure 4:
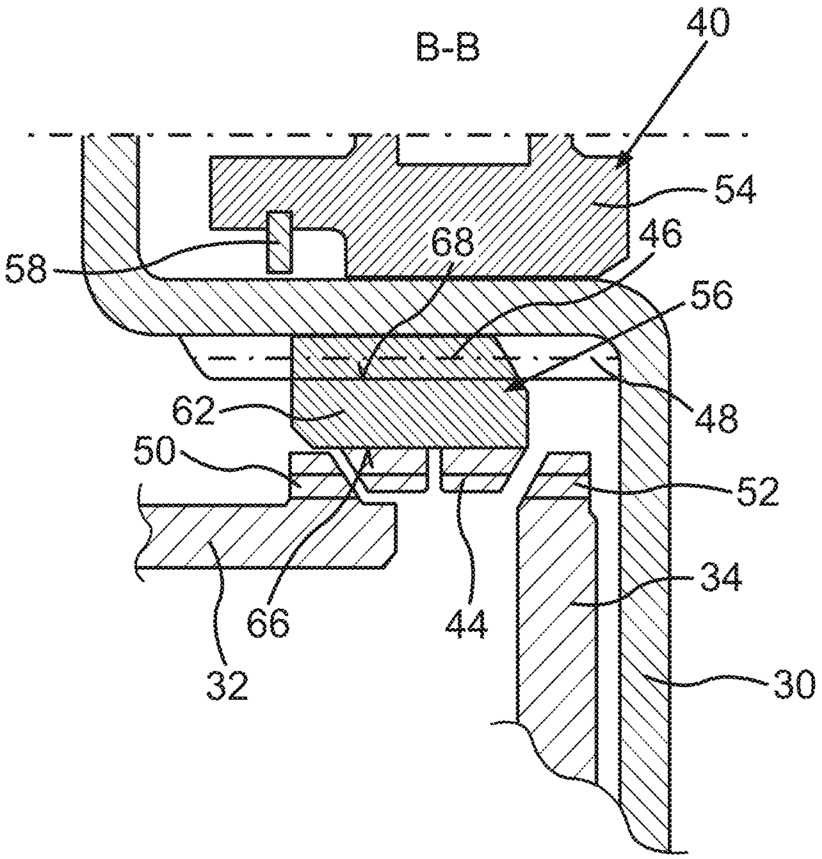

The drawing shows in:

FIG. 1 a schematic illustration of an electric drive device for a motor vehicle;

FIG. 2 a detail of a schematic front view of a gearbox of the drive device;

FIG. 3 a detail of a schematic sectional view of the gearbox along a section line A-A shown in FIG. 2; and FIG. 4 a detail of a schematic sectional view of the gearbox along a section line B-B shown in FIG. 2.

In the figures, identical or functionally identical elements are provided with the same reference signs.

DETAILED DESCRIPTION

In a schematic illustration, FIG. 1 shows an electric drive device 10 of a motor vehicle, also simply referred to as a vehicle, which is preferably formed as an automobile, more particularly as a passenger car. The drive device 10 is also referred to as a drive system. In its completely produced state, the motor vehicle has at least or exactly two vehicle axles, which are also simply referred to as axles, arranged successively in the vehicle longitudinal direction of the motor vehicle and thus one behind the other. The respective vehicle axle has at least or exactly two vehicle wheels which are also simply referred to as wheels. The respective vehicle wheels of the respective vehicle axle are arranged on opposite sides of the motor vehicle, also referred to as a vehicle, in the vehicle transverse direction of the motor vehicle. The vehicle wheels of at least or exactly one of the vehicle axles or the vehicle wheels of both vehicle axles can be driven electrically, in particular purely electrically, by means of the drive system, whereby the motor vehicle can be electrically driven, in particular purely electrically. The vehicle wheels that can be driven by means of the drive device 10 are represented particularly schematically in FIG. 1 and are referenced with 12 and 14. The vehicle axle comprising the vehicle wheels 12 and 14 is labelled with 16.

The electric drive device 10 has an electric engine 18, represented particularly schematically in FIG. 1, which has a stator 20 and a rotor 22. The rotor 22 can be driven by means of the stator 20 and thus can be rotated around a first engine rotational axis 24, relative to the stator 20 and relative to a housing 26, shown particularly schematically in FIG. 1, of the drive system. The electric engine 18 can provide drive torques via the rotor 22, for driving the vehicle wheels 12 and 14.

The electric drive device 10 has a gearbox 28, which has a first gear element 30, shown particularly schematically in FIG. 1, a second gear element 32, and a third gear element 34. For example, the gearbox 28 has a planetary gear set 36 which is also simply referred to as a planet set. The planetary gear set 36 has a sun gear, a planetary carrier, which is also referred to as a bar, and a ring gear. For example, the planetary gear set 36 has at least one or more planetary gears. The respective planetary gear can be rotatably mounted on the planetary carrier and meshes, in particular simultaneously, with the sun gear and the ring gear. The sun gear, the planetary carrier, and the ring gear are also referred to as planetary gear set elements of the planetary gear set 36. The rotor 22 has a rotor shaft, for example, via which the rotor 22 can provide the respective drive torque. In the exemplary embodiment shown in the figures, the first gear element 30 is the rotor shaft of the rotor 22, for example. The gear element 32 is a first of the planetary gear set elements, for example, and the gear element 34 is a second of the planetary gear set elements, for example. In FIG. 1, further gearbox components of the gearbox 28, provided in addition to the gear elements 30, 32 and 34, are illustrated with 37.

It is illustrated by an arrow 39 that the gear element 30 can be or is connected to the further gearbox components 37 in a torque-transmitting manner, in particular for conjoint rotation. Thus, the respective drive torque can be introduced into the planetary gear set 36 from the gear element 30. The planetary gear set 36 can provide a respective input torque, resulting from the respective drive torque, in particular via the gear element 32 or the gear element 34, which input torque can be used for driving the vehicle wheels 12 and 14. The gear elements 30, 32, and 34 can be rotated around the engine rotational axis 24, also simply referred to as a rotational axis, relative to the housing 26. For example, the gear elements 32, 34 and 30 are arranged in the housing 26.

In order to be able to selectively connect the first gear element 30 to the gear element 32 or the gear element 34 for conjoint rotation, a switching device 38 is provided which is explained in more detail in the following. The switching device 38 has a sliding sleeve 40, which can be moved between at least one first engage position, at least one second engage position, and at least one neutral position along a sliding direction illustrated by a double arrow 42 relative to the housing 26. It can be seen that the sliding direction runs in the axial direction of the drive system or coincides with the axial direction, so that the sliding sleeve 40 can be moved relative to the housing 26. The first engage position is also referred to as a first position, the second engage position is also referred to as a second position, and the neutral position is also referred to as a third position. Thus, the sliding sleeve 40 can be axially moved between the positions relative to the housing 26.

From an overview of FIGS. 1 and 2, it can be seen that the gear elements 30, 32, and 34 are arranged coaxially to each other, wherein the sliding sleeve 40 is arranged coaxially to the gear elements 30, 32, and 34. In FIG. 2 to 4, the switching device 38 is illustrated in more detail. As can be seen from FIGS. 3 and 4, the sliding sleeve 40 has an internal sliding sleeve toothing 44 and an external sliding sleeve toothing 46. The first gear element 30 has an internal toothing 48. The second gear element 32 has a first external toothing 50 and the third gear element 34 has a second external toothing 52. The sliding sleeve 40 is permanently connected to the first gear element 30 for conjoint rotation, via the external sliding sleeve toothing 46 and the internal toothing 48. For this purpose, the external sliding sleeve toothing 46 is permanently engaged with the internal toothing 48. The sliding sleeve 40 can be axially moved between the positions relative to the gear elements 30, 32, and 34 and thus relative to the internal toothing 48 and relative to the external toothings 50 and 52. In FIG. 3, the neutral position is labelled with N. The first engage position is labelled with A, and the second engage position is labelled with B. In the first engage position A, the sliding sleeve 40 is connected to the second gear element 32 for conjoint rotation via the internal sliding sleeve toothing 44 and the first external toothing 50 and to the first gear element 30 for conjoint rotation via the external sliding sleeve toothing 46 and the internal toothing 48, in that the internal sliding sleeve toothing 44 engages into the first external toothing 50 and the external sliding sleeve toothing 46 engages into the internal toothing 48, while the gear element 34 is decoupled from the sliding sleeve 40 and thus from the gear elements 30 and 32 and thus can be rotated around the rotational axis relative to the sliding sleeve 40 and relative to the gear elements 30 and 32. This is realized in that in the first engage position A, the internal sliding sleeve toothing 44 engages into the first external toothing 50, but not into the second external toothing 52 as well.

In the second engage position B, the sliding sleeve 40 is connected to the gear element 34 for conjoint rotation via the internal sliding sleeve toothing 44 and the second external toothing 52 and to the first gear element 30 for conjoint rotation via the external sliding sleeve toothing 46 and the internal toothing 48, while the gear element 32 is decoupled from the sliding sleeve 40 and from the gear elements 30 and 34 and thus can be rotated around the rotational axis relative to the sliding sleeve 40 and relative to the gear elements 30 and 34. This is realized in that in the second engage position B, the internal sliding sleeve toothing 44 engages into the external toothing 52, but not into the external toothing 50 as well. Thus, in the first engage position A, the gear element 32 is connected to the gear element 30 for conjoint rotation by means of the sliding sleeve 40, while the gear element 34 can be rotated around the rotational axis relative to the gear elements 30 and 32 and relative to the sliding sleeve 40. In the second engage position B, the gear element 34 is connected to the gear element 30 for conjoint rotation by means of the sliding sleeve 40, while the gear element 32 is decoupled from the sliding sleeve 40 and from the gear elements 30 and 34 and thus can be rotated around the rotational axis relative to the gear elements 30 and 34 and relative to the sliding sleeve 40.

In the neutral position N, the sliding sleeve 40 is connected, in relation to the gear elements 30, 32, and 34, only to the first gear element 30 for conjoint rotation, in that the sliding sleeve 40 is connected to the gear element 30 for conjoint rotation via its external sliding sleeve toothing 46 and the internal toothing 48. In the neutral position N, the internal sliding sleeve toothing 44 neither engages into the external toothing 50 nor into the external toothing 52. Thus, all three gear elements 30, 32, and 34 are decoupled form each other in the neutral position, and thus can be rotated around the rotational axis relative to each other.

It can be seen particularly well from FIG. 3 that in the exemplary embodiment shown in the figures, the sliding sleeve 40 is designed in two parts and in this case has a first sleeve part 54 and a second sleeve part 56. The sleeve parts 54 and 56 are designed separately from each other and are connected to each other, in particular for conjoint rotation and in the axial direction of the drive device 10. For this purpose, a connecting element 58 is provided, for example, which is designed separately from the sleeve parts 54, 56, for example. For example, the connecting element 58 is designed as a securing ring, by means of which the sleeve part 56 is secured to the sleeve part 54, in particular in such a way that relative rotations, occurring around the rotational axis, between the sleeve parts 54, 56 and relative movements, occurring in the axial direction of the drive device 10, between the sleeve parts 54, 56 are prevented.

It can be seen that the sleeve part 56 has a bar 60, referred to as a tab, which extends at least substantially in the radial direction of the drive system 10. In this case, the sleeve part 56 has a cylinder section 62 that is designed to be cylindrical on the outer circumference and/or the inner circumference. The bar 60 extends away in the radial direction of the drive device 10 outward from the cylinder section 62. The first gear element 30 has a through-opening 64, also referred to as a window, which is penetrated by the bar 60. The bar 60 is thus partially arranged on a first side S1 and partially on a second side S2 of the first gear element 30, wherein the second side S2 points inward in the radial direction of the drive device 10 and away from the side S2, such that the side S1 points outward in the radial direction of the drive device 10 and in particular away from the external toothings 50 and 52 and from the internal sliding sleeve toothing 44. This means that the external toothings 50 and 52 and the internal sliding sleeve toothing 44 are arranged on the side S2, wherein the cylinder section 62 and a first part of the bar 60 are also arranged on the side S2. A second part of the bar 60 and the sleeve part 54 are arranged on the first side S1. For example, the through-opening 64 is a slot. In particular, the through-opening 64 extends in elongate fashion in the axial direction of the drive device 10, such that the bar 60 can be moved axially, i.e., in the axial direction of the drive device 10 in the through-opening 64, relative to the gear element 30. The sleeve part 56 and the sleeve part 54 and thus the sliding sleeve 40 can be moved as a whole together with the bar 60 axially relative to the gear elements 30, 32, and 34, whereby the sliding sleeve 40 can be moved axially and relative to the housing 26 and relative to the gear elements 30, 32 and 34 between the positions.

It can be seen that the external toothings 50 and 52 are arranged radially inside the internal toothing 48, i.e., as viewed in the radial direction of the electric drive device 10. The internal toothing 48 is also arranged on the side S2. It can be seen particularly well from FIG. 2 that the bar 60, also referred to as a tab, extends over an angular range in the circumferential direction of the sliding sleeve 40, which runs around the rotational axis and thus around the axial direction of the drive device 10, said angular range being greater than 10 degrees, for example. Furthermore, it can be seen from FIGS. 3 and 4 that the internal sliding sleeve toothing 44 is provided on an inner side 66 of the cylinder section 62, pointing inward in the radial direction of the drive device 10, and the external sliding sleeve toothing 46 is provided on an outer side 68 of the cylinder section 62, pointing outward in the radial direction of the drive device 10. Therefore, a particularly compact design can be realized.

Preferably, it is provided that the sliding sleeve 40 has several, in particular at least or exactly three bars 60 which, for example, are arranged evenly distributed in the circumferential direction of the drive device 10 and thus the sliding sleeve 40. Consequently, for example, the gear element 30 has several, in particular at least or exactly three through-openings 64, which are penetrated by the respective bars 60 in the radial direction and are arranged evenly distributed in the circumferential direction. The through-opening 64 has such a large extension when viewed radially outwards, that the extension of the through-opening 64, running radially outwards, is greater than or identical to an extension of the bar 60, running radially outwards. Therefore, the bar 60 can be plugged into the through-opening 64 in the axial direction, so that the sleeve part 56 can be mounted on the sleeve part 54 in the axial direction and, for example, can be secured by means of the connecting element 58. Therefore, simple and cost-effective mounting can be ensured. The external toothings 50 and 52, the internal toothing 48 and the external sliding sleeve toothing 46 and the internal sliding sleeve toothing 44 are preferably designed as sliding toothings, which enable the sliding sleeve 40 to be moved axially between the positions relative to the gear elements 30, 32, and 34.

In a particularly advantageous embodiment, connecting element 58 and bar 60 could alternatively, however, also be replaced by several cylinder pins, for example three cylinder pins, which are arranged perpendicular to the rotational axis, i.e., in a radial direction, and connect the sleeve part 54 and the sleeve part 56 axially fixedly for conjoint rotation and thus prevent relative movements. Similarly, then both sleeve parts 54 and 56 and the first gear element 30 are connected to the cylinder pins for conjoint rotation via the through-opening 64, which for example, is designed as an elongated hole or slot, or both sleeve parts 54 and 56 and the first gear element 30 are connected to the cylinder pins for conjoint rotation via several through-openings 64.

The sliding sleeve 40, in particular the sleeve part 54, has a cavity 70, designed for example as a groove. The cavity 70 is a ring groove, for example, which runs around, in particular completely, in the circumferential direction of the drive device 10, running around the axial direction, and thus of the sliding sleeve 40. The drive device 10 has an actuating element 72, for example, represented particularly schematically in FIG. 3, which is designed separately from the sliding sleeve 40. It can be seen that the actuating element 72 engages into the cavity 70, whereby the actuating element 72 interacts with the sliding sleeve 40. For example, the actuating element 72 is a shift fork that engages into the cavity 70 over an angular range running in the circumferential direction, and therefore engages around the sliding sleeve 40 over the angular range. Preferably, the angular range is greater than 90 degrees. In particular, the angular range can be smaller than or equal to 180 degrees. The actuating element 72 can be moved axially, i.e., in the axial direction of the drive device 10, relative to the housing 26 and relative to the gear elements 30, 32, and 34. Because the actuating element 72 engages into the cavity 70, the actuating element 72 is coupled to the sliding sleeve 40 in a form-fitting manner, such that the sliding sleeve 40 is moved axially together with the actuating element 72 relative to the gear elements 30, 32, and 34, by axially moving the actuating element 72. Thus, the sliding sleeve 40 can be moved axially between the positions by axially moving the actuating element 72. For example, an actuating device 74, represented particularly schematically in FIG. 3, is provided which can be operated electromechanically or hydraulically for example, and thus is designed as an electromechanical or hydraulic actuating device. The actuating element 72 and with this the sliding sleeve 40 can be moved axially by means of the actuating device 74, in order thereby to be able to realize a space-efficient and needs-based movement of the sliding sleeve 40.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

10 electric drive device
12 vehicle wheel

14 vehicle wheel
16 vehicle axle
18 electric engine
20 stator
22 rotor
24 engine rotational axis
26 housing
28 gearbox
30 first gear element
32 second gear element
34 third gear element
36 planetary gear set
37 gear components
38 switching device
39 arrow
40 sliding sleeve
42 double arrow
44 internal sliding sleeve toothing
46 external sliding sleeve toothing
48 internal toothing
50 first external toothing
52 second external toothing
54 sleeve part
56 sleeve part
58 connecting element
60 bar
62 cylinder section
64 through-opening
66 inner side
68 outer side
70 groove
72 actuating element
74 actuating device
S1 side
S2 side
A first engage position
B second engage position
N neutral position

The invention claimed is:

1. An electric drive device for a motor vehicle, the electric drive device comprising:

a first gear element having an internal toothing;

a second gear element arranged coaxially to the first gear element and having a first external toothing arranged radially inside the internal toothing of the first gear element;

a third gear element arranged coaxially to the first gear element and coaxially to the second gear element and having a second external toothing arranged radially inside the internal toothing of the first gear element;

a sliding sleeve having an internal sliding sleeve toothing and an external sliding sleeve toothing, wherein the sliding sleeve is permanently connected to the first gear element to conjointly rotate via the external sliding sleeve toothing and the internal toothing of the first gear element, wherein the sliding sleeve is movable between at least one first engage position as a first position, wherein in the at least one first engage position the sliding sleeve is connected to the second gear element to conjointly rotate via the internal sliding sleeve toothing and the first external toothing of the second gear element, and the first gear element to conjointly rotate via the external sliding sleeve toothing and the internal toothing of the first gear element, at least one second engage position as a second position, wherein in the at least one second engage position the sliding sleeve is connected to the third gear element to conjointly rotate via the internal sliding sleeve toothing and the second external toothing of the third gear element, and the first gear element to conjointly rotate via the external sliding sleeve toothing and the internal toothing of the first gear element, and at least one neutral position as a third position, wherein in the at least one neutral position the sliding sleeve is connected, in relation to the first, second, and third gear elements, only to the first gear element to conjointly rotate by the sliding sleeve being connected to the first gear element to conjointly rotate via the external sliding sleeve toothing and the internal toothing of the first gear element; and a connecting element and a bar or several cylinder pins, wherein a first sleeve part and a second sleeve part of the sliding sleeve are connected to conjointly rotate and in an axially fixed manner, wherein the first and second sleeve parts and the first gear element are connected to the cylinder pins or to the connecting element and bar via at least one through-opening in the first gear element.

2. The electric drive device of claim 1, wherein an axial travel range, within which the sliding sleeve is movable between the first, second, and third positions, or an axial length of the internal toothing of the first gear element extends axially from the first external toothing of the second gear element up to the second external toothing of the third gear element.

3. The electric drive device of claim 1, wherein electric drive device includes the connecting element and the bar, wherein the bar extends radially outward away from a cylinder section of the sliding sleeve, wherein the internal sliding sleeve toothing is on an inner side of the cylinder section pointing radially inward, and wherein the external sliding sleeve toothing is on an outer side of the cylinder section pointing radially outward.

4. The electric drive device of claim 1, further comprising:

an axially moveable actuating element configured to axially move the sliding sleeve between the first, second, and third positions with axial movement of the axially moveable actuating element.

5. The electric drive device of claim 4, wherein electric drive device includes the connecting element and the bar, and wherein the sliding sleeve is axially moveable between the first, second, and third positions via the bar by the axially moveable actuating element with axial movement of the axially moveable actuating element.

6. The electric drive device of claim 4, wherein the first gear element has a through-opening which is engaged through by the axially moveable actuating element that engages into a corresponding cavity of the sliding sleeve, wherein the sliding sleeve is axially movable between the first, second, and third positions relative to the first gear element by the axially moveable actuating element with axial movement of the axially moveable actuating element in the through-opening.

7. The electric drive device of claim 4, further comprising:

an electromechanical or hydraulic actuating device configured to axially move the axially moveable actuating element.

8. The electric drive device of claim 1, wherein the first gear element is a rotor shaft of a rotor of an electric engine of the electric drive device, the second gear element is a first planetary gear set element of a planetary gear set, and the third gear element is a second planetary gear set element of the planetary gear set.

* * * * *